Sept. 9, 1924.  
S. A. DOBYNE  
FASTENER INSERTING MACHINE  
Filed June 11, 1917

Inventor:  
STEPHEN A. DOBYNE,  
By John N. Breninger  
His Attorney

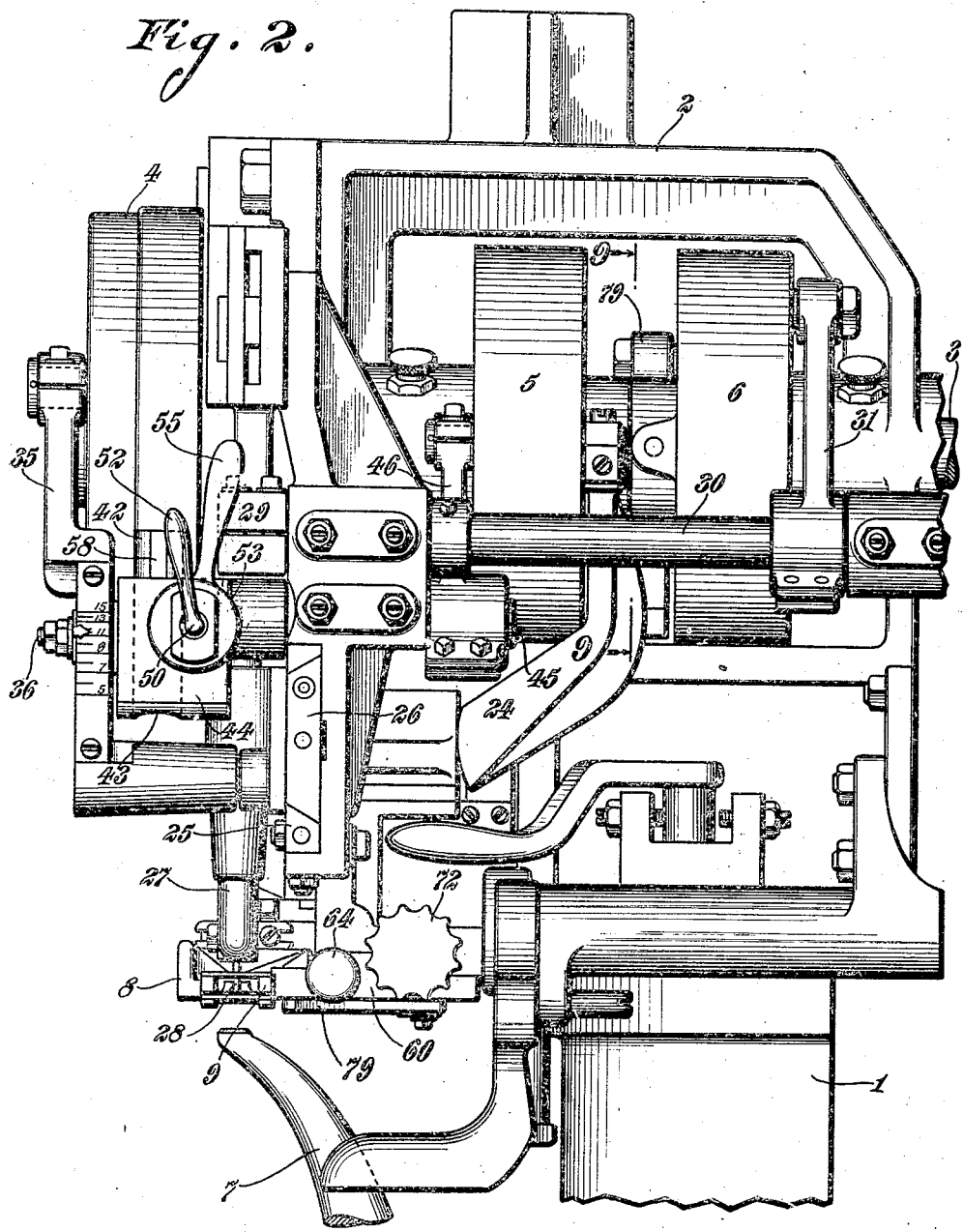

Sept. 9, 1924.
S. A. DOBYNE
1,507,667
FASTENER INSERTING MACHINE
Filed June 11, 1917  6 Sheets-Sheet 3
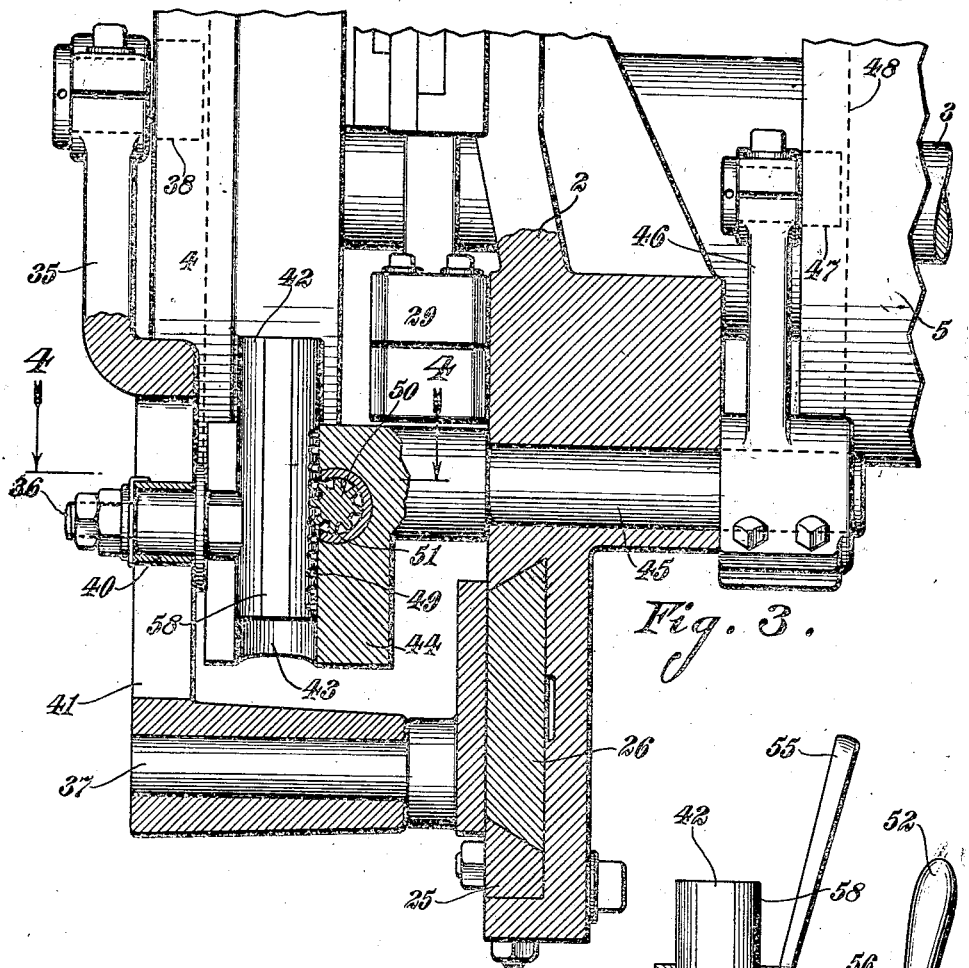
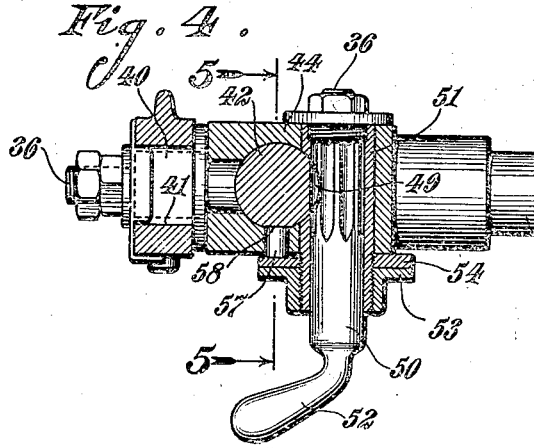
Inventor:
STEPHEN A. DOBYNE, Sept. 9, 1924.  1,507,667

S. A. DOBYNE

FASTENER INSERTING MACHINE

Filed June 11, 1917  6 Sheets-Sheet 4

Inventor:
STEPHEN A. DOBYNE,
By John N. Bruninga
His Attorney

Sept. 9, 1924.

S. A. DOBYNE 1,507,667

FASTENER INSERTING MACHINE

Filed June 11, 1917      6 Sheets-Sheet 5

Inventor:
STEPHEN A. DOBYNE,
John H Bruninga
His Attorney

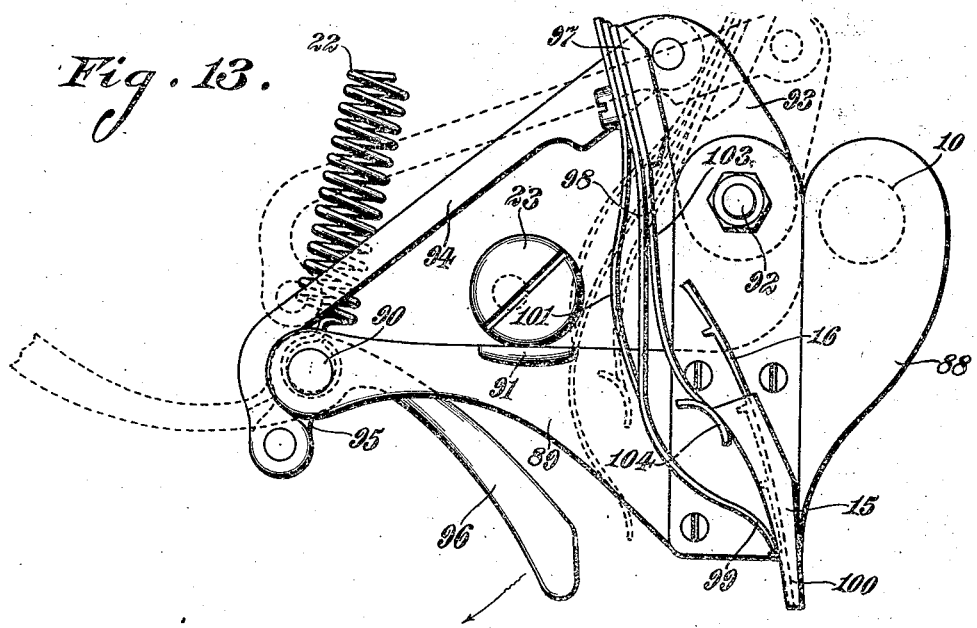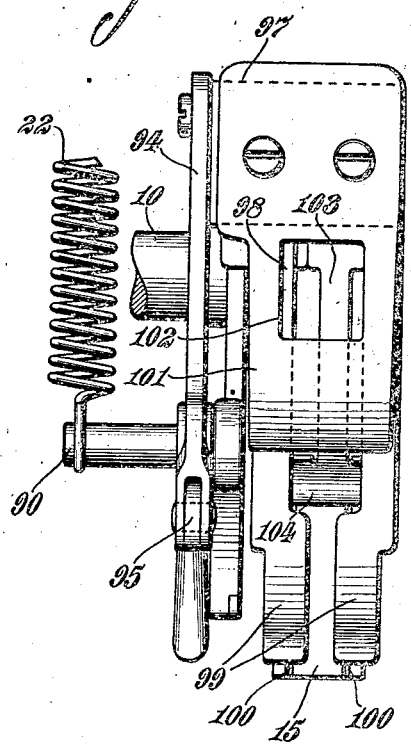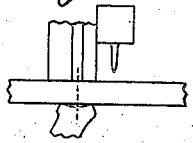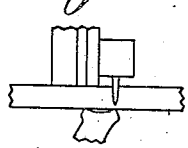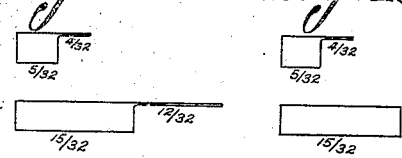

Patented Sept. 9, 1924.

1,507,667

UNITED STATES PATENT OFFICE.

STEPHEN A. DOBYNE, OF ST. LOUIS, MISSOURI, ASSIGNOR TO CHAMPION SHOE MACHINERY COMPANY, OF ST. LOUIS, MISSOURI, A CORPORATION OF MISSOURI.

FASTENER-INSERTING MACHINE.

Application filed June 11, 1917. Serial No. 174,096.

*To all whom it may concern:*

Be it known that I, STEPHEN A. DOBYNE, a citizen of the United States, and residing at St. Louis, Missouri, have invented the new and useful Improvement in Fastener-Inserting Machines, of which the following is a specification.

This invention relates to fastener inserting machines, and more particularly machines for inserting fasteners in boots and shoes.

Fastener inserting machines of the metallic type are used for two distinct operations, namely, sole attaching and slugging operations. In the sole attaching operation the fastener is driven through the sole and clinched on the insole, while in the slugging operation a series of wear resisting slugs are driven along the edge of the sole or heel to form a wear resisting surface. In the sole attaching operation, the spacing of the fasteners is considerable, while in the slugging operation, the slugs are driven close together, sometimes as close as one-eighth of an inch. Now where a fastener inserting machine is adapted for both of these operations, as is, for instance the case in repair shops where the duplication of machines is not economical, it is necessary to vary the feed considerably, sometimes this feed varying from three-thirty-seconds of an inch for slugging to fifteen-thirty-seconds for sole attaching.

In an awl feed machine it is necessary that the throat and awl will be movable into and out of the line of drive, so as to position the awl hole in the line of drive to receive the fastener. The distance between the center of the awl and the center of the driver passage in the throat cannot, however, for constructional reasons, be less than a given amount; as a matter of fact, in a substantially constructed shoe machine, this distance cannot be less than nine-thirty-seconds of an inch. This can readily be seen on reference to Figures 15 and 16. Now if it is desired to space the fasteners, such as slugs, less than the distance between the awl and the driver passage, then it is necessary to move the awl laterally while it clears the work, a distance equal to the difference between the spacing of the awl and the driver passage and the desired feed of the work. In other words, the awl must be moved laterally from a position shown in Figure 15 to a position shown in Figure 16, before this awl can be moved downwardly to pierce the work. This means that the awl must be moved in such a case, in sucessive steps, one of which is a clearing step, and the other is a work feeding step, the awl being moved downwardly to pierce the work during the dwell between the steps.

Where a single cam is used to move the awl laterally through both successive steps with a dwell therebetween, then the clearing and feeding movements have fixed definite relations, so that one will necessarily increase with the other. Thus, where as in Figure 17, (top diagram) the machine is set, for instance, for its minimum feed of five-thirty-seconds of an inch, the clearing movement must necessarily be four-thirty-seconds of an inch. If now the machine is set for, for instance, the maximum feed, Figure 17, (lower diagram) of say, fifteen-thirty-seconds of an inch, then the clearing movement will necessarily be twelve-thirty-seconds of an inch. In other words the total travel of the awl for a maximum feed will be twenty-seven-thirty-seconds of an inch, that is, nearly twice the effective feed movement of the awl. In view of the fact, however, that these machines are made to run at high speeds, such an excessive travel of the awl and its supporting slide, causes undue vibration of the machine, very soon wears out the cam, and in fact, tears the machine to pieces.

One of the objects of this invention, therefore, is to provide a fastener inserting machine in which the awl feed mechanism is so constructed and arranged as to reduce the effective travel of the awl to a minimum, at the same time permitting adjustment of the awl from a minimum to a maximum feed movement.

In the operation of fastener inserting machines, it is desirable to adjust the extent of insertion of a fastener. This can, of course, be accomplished by adjusting the driver, but such adjustment is complicated, and cannot be obtained with the desired accuracy, nor with any degree of rapidity.

Another object of this invention, therefore, is to construct a fastener inserting machine in which means are provided for adjusting the presser foot so as to permit quick adjustment of the insertion of the fastener.

In a string nailing machine, the string of connected nails is fed by a feeding and cutting member which moves downwardly along a movable string-nail guide, and feeds the string of connected nails into the throat. Now if, as sometimes occurs, a driver should break and stick in the throat, so as to project above the same and in the path of the nail-guide, this driver will prevent transverse movement of the nail-guide and the feeding and cutting member with respect to the throat to feed the string and cut off a nail. This is liable to cause breaking or shifting of the cutter blade in its supporting arm, both of which require careful readjustment and considerable time. It is, moreover, necessary and desirable to adjust this string nail guide with respect to the throat. The string of connected nails should, moreover, be readily removable from the string nail guide.

Another object of this invention, therefore, is to provide a yielding connection between the feeding and cutting member and its actuator, so as to prevent breakage or mal-adjustment of the feeding and cutting member.

Another object is to provide means for adjusting the string nail guide, to aline the string of connected nails in the guide, with respect to the driver passage within the throat.

Another object is to improve the construction of the string nail guide and its guards, so as to permit quick release and insertion of the string of connected nails.

Further objects will appear from the detail description taken in connection with the coupling drawing, in which:—

Figure 2 is a side elevation;

Figure 3 is an enlarged section on the line 3—3, Figure 1;

Figure 4 is a section on the line 4—4, Figure 3;

Figure 5 is a section on the line 5—5, Figure 4;

Figure 13 is an enlarged detail section of the string nail guide;

Figure 14 is a side elevation of Figure 13;

Figures 15, 16, 17 and 18 are diagrams illustrating the operation of this machine; and, Figure 19 is a cam diagram showing the relation of the parts.

Figure 1:
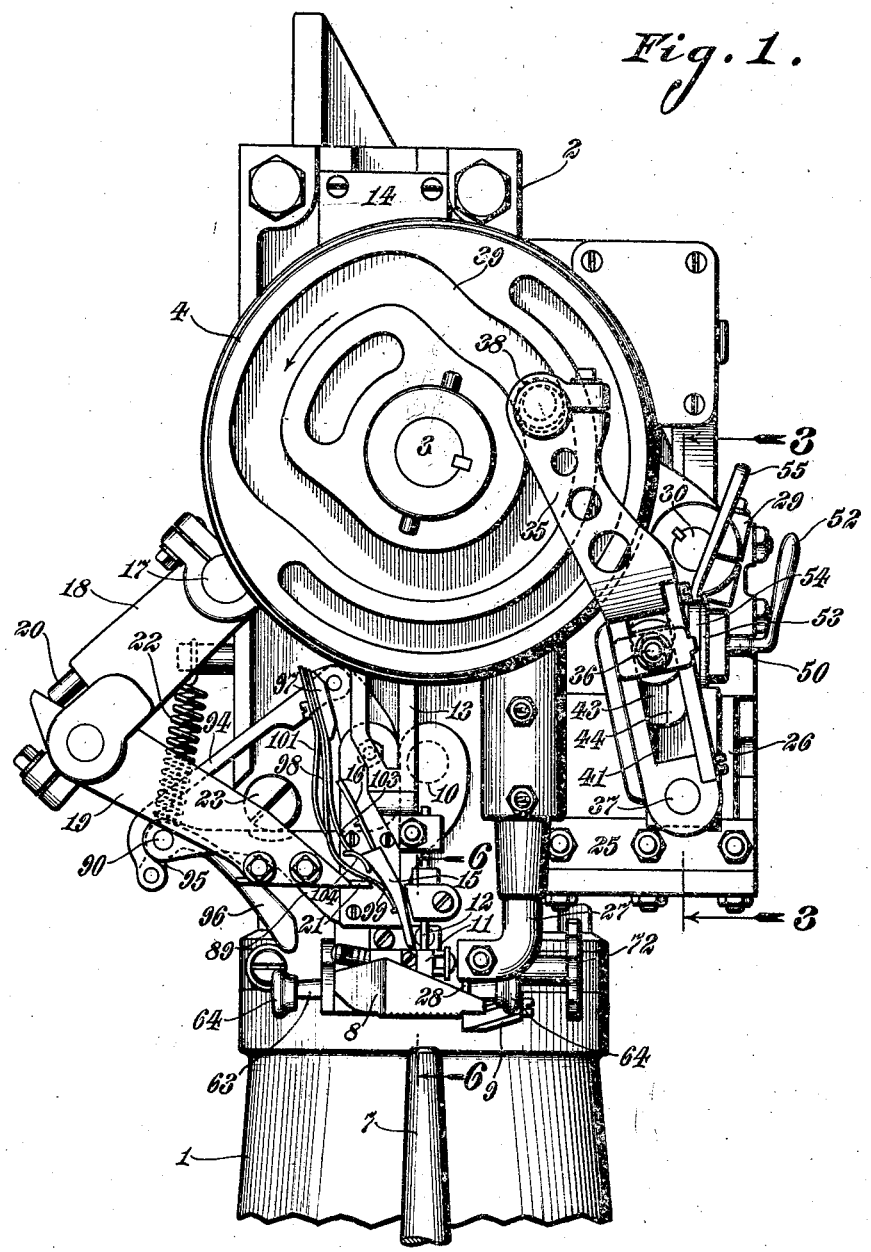
Figure 1 is a front elevation of a fastener inserting machine embodying this invention.

Referring to the accompanying drawings, and first more particularly to Figures 1 and 2, the machine there shown is generally of the construction shown in Patent No. 1,286,559, patented December 3, 1918. It comprises generally, a column 1 upon which is mounted a machine head 2 provided with bearings for sustaining the various movable parts, among which is a main drive shaft 3, which is provided with a suitable clutch and brake. Fixed to this shaft are cam wheels 4, 5 and 6, each of which is provided on both of its side faces with grooved cams. A suitable horn 7 supports the work against a presser foot 8, and there is also provided a welt guide 9, fixed to the machine head. Pivoted at 10 on the machine head, is a throat 11, having a driver passage with which cooperates a driver 12, attached to a driver bar 13, mounted in a suitable guide 14 on the machine head, and operated by a cam in the right face (Figure 2) of the cam wheel 4. Pivoted also at 10 is a nail guide 15, grooved to receive one or more strands of connected nails 16, these nails having either laterally projecting heads, or simply tapering shanks, depending upon whether they are to be used for sole attaching or as slugs. Pivoted at 17 on the machine head is an arm 18 having pivoted thereto, an arm 19, normally moved in a counter-clock-wise direction by a spring plunger 20, and having a feeding and cutting member 21, adapted to feed the string of nails into the throat and cooperate with the throat to cut a nail from the string. The arm 18 and the cutter are operated from a cam groove in the left side (Figure 2) of the cam wheel 6. The string nail guide 15 is held by a spring 22 against a stop 23 on the machine head, while the throat has connected therewith, an arm 24, operated by a cam groove in the right face (Figure 2) of the cam wheel 5. The cam groove in the right face of the cam wheel 5 is so formed as to cause the throat to dwell in fastener inserting position thereby insuring the positioning of the same beneath the driver during the fastener inserting operation as more specifically set forth in the patent above referred to. Mounted in a guide 25 on the machine head is a slide 26, carrying an awl bar 27, provided at its lower the clearing movement is entirely eliminated, so that the total movement of the awl will at that time be an actual feeding movement, nevertheless during minimum feed movement, at which time there is a full clearing movement imparted to the awl, the total movement of the awl will be considerably less than the total movement during maximum feeding movement. Accordingly while the clearing movement is being taken up during increase in feed, the total movement is varied and increases until at maximum it constitutes the total movement. When the feeding movement is decreased from a maximum to a minimum, the total movement is also decreased to a point where the full clearing movement is a maximum, as is necessary in view of the fact that the total movement can never be less than the normal or minimum distance between the awl and the throat taken from their median lines. It will be seen that upon varying of the feeding movement, the total movement is varied in the same sense, but that the clearance and feeding movements are varied in the opposite senses, and that this clearance movement is also varied in the opposite sense as the total movement, that is, upon increase of the clearing movement, the feeding total movements of the awl will be decreased and vice versa.

In view of the fact that the normal distance between the throat and awl is greater than the desired minimum feeding movement, it is necessary that the clearing movement be continued while the throat moves out of the line of drive and accordingly, the feeding movement must begin in such cases after the throat is out of the line of drive. Accordingly, the parts must be constructed so as to permit the movement of the awl beyond its initial position (while the throat is in the line of drive), during the clearing movement and when the feeding movement is less than the normal distance between the awl and the throat.

It will, therefore, be seen that with this construction, the maximum movement of the feed slide can never be greater than the maximum feed movement of the awl, so that this maximum movement is nearly cut in half, as compared to a construction in which a single cam groove or actuator is used, as illustrated in Figure 17. With this construction, therefore, the vibration of the feed slide is reduced to a minimum.

The presser foot adjustment.

Figure 6:
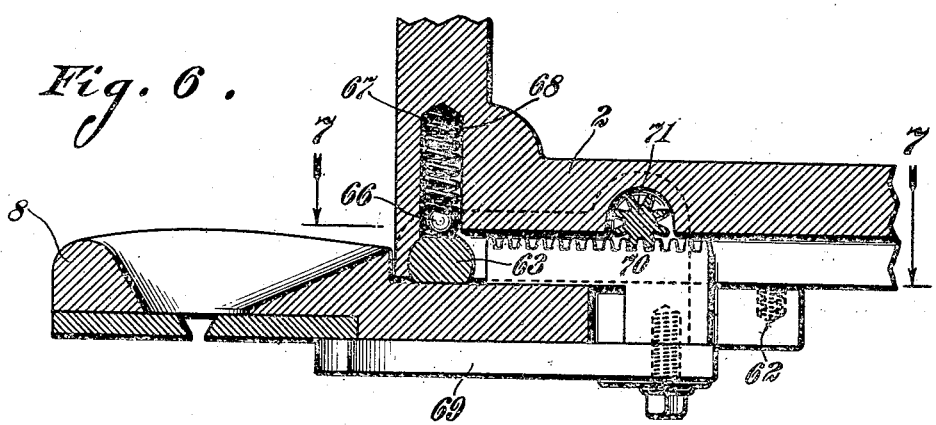
Figure 6 is an enlarged section on the line 6—6, Figure 1.
Figure 7:
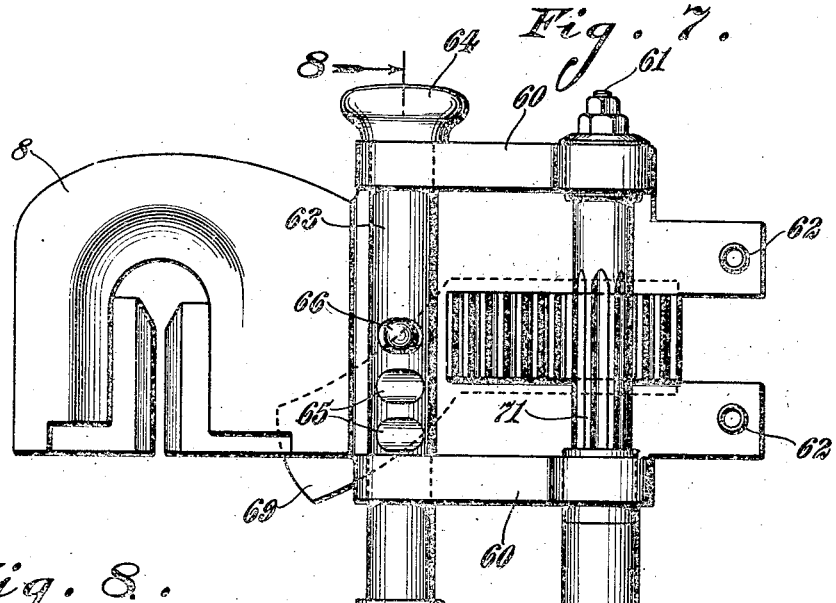
Figure 7 is a plan of Figure 6, taken along the line 7—7, Figure 6.
Figure 8:
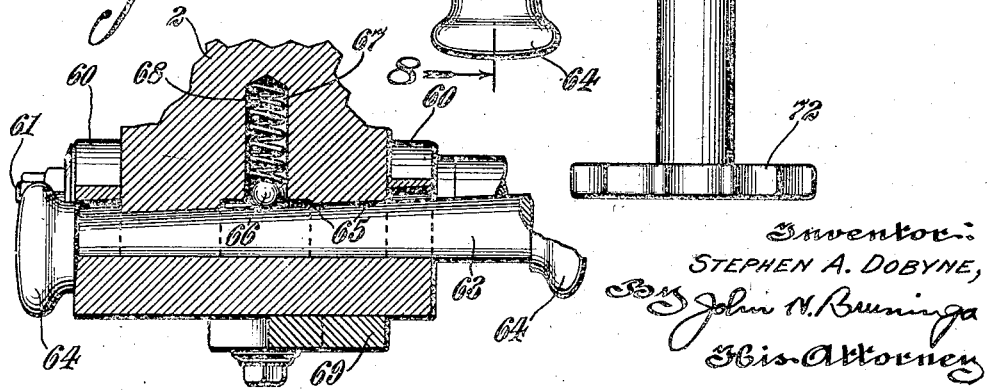
Figure 8 is a section on the line 8—8, Figure 7.
Figure 9:
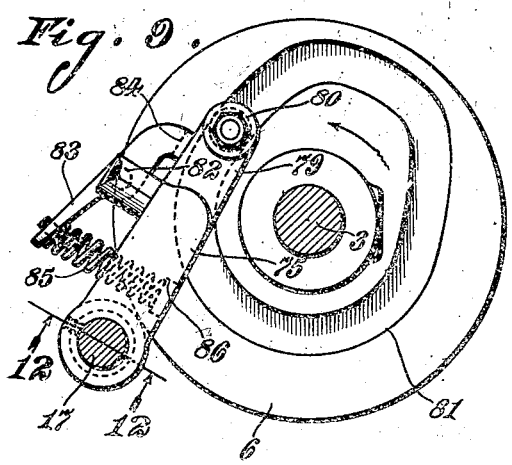
Figure 9 is a detail section on the line 9—9, Fig. 2.
Figure 10:
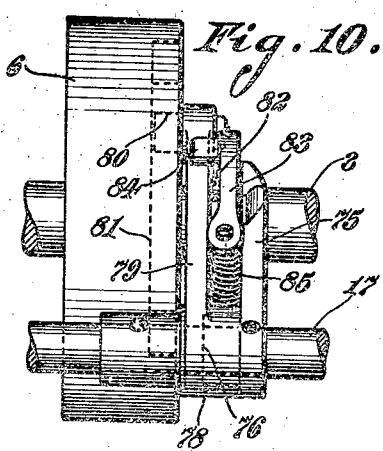
Figure 10 is a side elevation of Figure 9.
Figure 11:
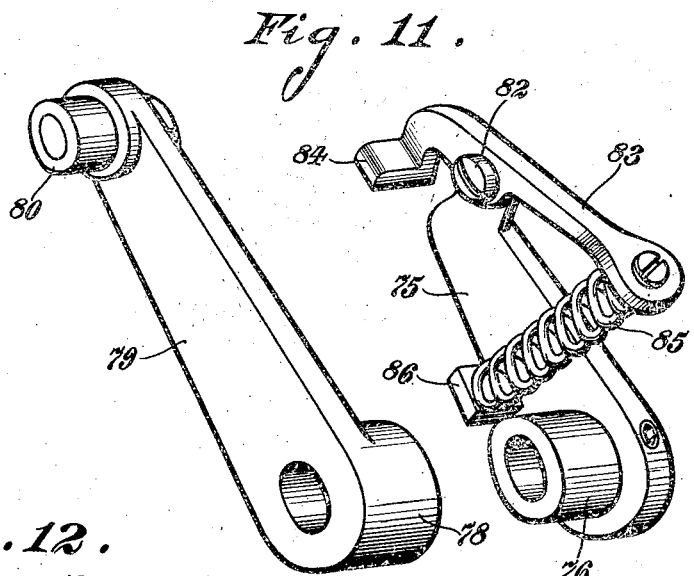
Figure 11 is a perspective view showing parts of the mechanism of Figures 9 and 10.
Figure 12:
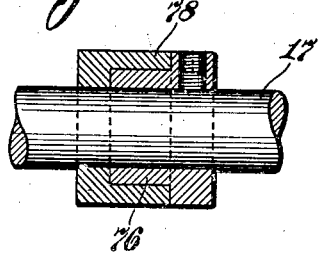
Figure 12 is an enlarged section on the line 12—12, Figure 9.

Referring to Figures 6, 7 and 8, the presser foot 8 is shown as mounted on a carrier 60, which is pivoted intermediate its ends at 61 on the machine head 2. Springs 62 arranged in recesses in the rear ends of the presser foot, hold this presser foot at its front end against an adjusting shank 63, mounted in the carrier 60, and bearing with its upper face against a recess in the machine head 2. The shank 63 tapers from end to end, and is provided with knobs 64, whereby it may be moved endwise, this shank being provided with recesses 65, co-operating with a ball 66 arranged within a recess 67 in the machine head 2, and acted upon by a spring 68, so as to lock the shank in its different positions.

The pivot 61 for the carrier 60, constitutes an adjusting shaft for the work guide. This work guide 69 is arranged underneath the presser foot, and is provided with a rack arranged over the presser-foot, so as to form a unit therewith. This rack meshes with teeth 71, on the shaft 61, and this shaft is further provided with a head 72, so that adjustment of the head will adjust the guide towards and from the line of drive so as to selectively vary the edge spacing of the fastener.

Endwise movement of the shank 63 will vary the vertical position of the presser foot, so as to vary the position of its lower face with respect to the lower limit of movement of the bottom of the driver. The extent of insertion of the fasteners can, therefore, be readily varied by adjusting the presser foot, so as to selectively cause the fasteners to be inserted countersunk, flush, or slightly protruding from the upper face of the work. The machine is, therefore, adaptable to different classes of work without requiring readjustment of the driver. By pivoting the presser foot carrier at the point of adjustment of the work guide, the work guide can be moved as a unit with the presser foot, without disturbing its adjustment.

The feeding and cutting mechanism.

Referring now to Figures 9 to 12 inclusive, the shaft 17 has fixed thereto, an arm 75, and has loosely mounted thereon, and on a hub 76, connected with the arm 75, the hub 78 of an arm 79, which has a cam roll 80, engaging a cam groove 81, in the cam wheel 6. Pivoted at 82 on the arm 75 is a lever 83 which has a laterally projecting finger 84 bearing on the upper face of the arm 79, and having bearing against its outer end, a spring 85, abutting against a lug 86, on the arm 75.

It will, therefore, be seen that there is a yielding connection between the cam 81 and the arm 18. The spring 85 is, of course, strong enough to cause it to move the cutter along the nail guide 15, and to cause it to move the cutter against the die plate on the throat to cut the lowermost fastener from the string. If, however, the driver should break and project from the throat, so as to end with an awl 28. This awl bar is reciprocated vertically by means of an arm 29, on a rock-shaft 30, which has an arm 31, provided with a cam roll engaging a cam groove in the right face (Figure 2) of the cam wheel 6. The mechanism so far described, except as hereinafter noted, is of substantially the construction as shown in my patent referred to, to which patent reference is had for details of construction.

The awl feed mechanism.

In accordance with this invention, the awl is moved laterally in successive steps with an intervening dwell. The first step is a work clearing step and the awl is at that time clear of the work; the second step is a work feeding step and the awl is at that time in the work. Separate actuating cams are provided for imparting to the awl these separate successive movements. Adjusting mechanism is provided for adjusting the feed movement of the awl, and this also adjusts the clearing movement; the clearing movement, however, decreases as the feeding movement increases, from a maximum clearing movement, corresponding to a minimum feeding movement, to zero clearing movement, corresponding to maximum feed movement of the awl.

Referring now to Figures 1 to 5 inclusive, 35 designates a lever pivoted at 36, and having its lower end engaging a stud 37 on the feed slide 26, and provided at its upper end with a cam roll 38, engaging a cam groove 39 in the cam wheel 4. The pivot 36 of the lever 35, is in the form of a stud, which has a block 40 sliding in a guide-way 41 on the lever 35. This stud is fixed to a shank 42, sliding in a guide-way 43 in a crank 44, fixed to one end of a rock-shaft 45, the other end of which has fixed thereto an arm 46, provided with a cam roll 47, moving in a cam groove 48 in the cam wheel 5. The shank 42 is provided with teeth 49 meshing with a toothed shaft 50, mounted in the bushing 51 in the crank 44, and provided with an arm 52. Mounted between a nut 53 and the crank 44, is a plate 54 provided with an arm 55, and with a cam surface 56, engaging a locking pin 57, which slides freely in a bearing in the crank, and bears against a flattened portion 58 on the shank 42. The cam rolls 38 and 47 are mounted on studs which are eccentrically mounted in the ends of the arms 35 and 46 respectively, the ends of these arms being split and adapted to be clamped on the eccentric studs. This enables the cam rolls to be adjusted with respect to the arms, and locked in adjusted position.

The cam groove 48 is adapted to impart to the feed slide and the awl thereon, the work clearing movement, while the cam groove 39 imparts the work feeding movement, the awl piercing cam operating the arm 31 and the awl connected therewith, to cause the awl to pierce the work during the dwell between the clearing and feeding movements of the awl. This is clear from the cam diagram Figure 19. When the stud 36 is opposite the center of the rock-shaft 45, the feeding movement by the cam groove 39 is a maximum. It will be noted, however, that at this time, the clearing movement will be zero, as the movement of the arm 46 by the cam groove 48, will, at this time, have no effect whatsoever upon the feed slide. As, however, the stud 36 moves down with its shank 42, and away from the center of the rock-shaft 45, the feeding movement of the feed slide by the cam groove 39, will be decreased, but the clearing movement of the feed slide by the cam groove 48, will be increased. In the lowest position of the stud 36, the feed movement will be a minimum, while the clearing movement will be a maximum. It will, of course, be understood that the shank 42 is adjusted after releasing the pin 36, as shown in Figure 5, by turning the handle 52, and after the shank 42 has been set in adjusted position, this shank is locked by moving the handle 55 towards the observer.

Figure 18 shows the actual operation. The cam grooves 39 and 48, and the arms 35, 46 and 44, are so proportioned, that with a minimum feed, the clearing movement of the awl will be sufficient, so that the feed movement plus the clearing movement will be equal to, or be slightly greater than, the distance between the center of the throat and the center of the awl. Thereafter, with an increase of feed, as pointed out heretofore, the clearing movement will decrease uniformly, so that with a maximum feed movement, as shown in the lower diagram, Figure 18, the total movement of the awl will be a feeding movement, in that the clearing movement is at this time reduced to zero, on account of the fact that the stud 36 is at this time opposite the center of the shaft 45.

It will be noted that the actuators 35 and 46, while operated by separate cams, are nevertheless interconnected with one another and with the awl carrying slide 26 and the awl thereon so that while they operate independently to successively move the awl laterally in successive steps, there is no lost motion connection from either of these actuators to the awl, but the connections are maintained connections. Accordingly, in a high speed machine, to which this invention is particularly applicable, there will be no binding or vibration usually incident to the employment of lost motion connections.

Upon referring to Figure 18, it will be noted that while during maximum feeding, prevent movement of the nail guide to the right (Fig. 1), to feed the string and cut off a nail, then the spring 85 will yield and thus prevent breakage or shifting of the feeding and cutting blade 21 in its arm 19.

The nail guide.

Referring now to Figures 13 and 14, the nail guide 15 is mounted on a plate 88, which, as heretofore referred to, is pivoted at 10. This plate has a laterally projecting arm 89, provided with a laterally projecting pin 90, to one end of which is attached the spring 22. The arm 89 has a laterally projecting lug bearing against the stop 23, which as shown, is eccentrically mounted in the machine head, so as to permit adjustment thereof, to aline the nail guide 15 with the driver passage.

Pivoted at 92 on the plate 88, is an arm 93, which is connected by a link 94, with an arm 95, pivoted at 90, and having a handle 96. Attached to a laterally projecting lug 97 on the arm 93, is a plate 98 which is forked to provide guards 99, overlying the grooves 100 in the nail guide 15. The purpose of these guards is, of course, to prevent rearward movement of the strings of connected nails. Overlying the plate 98 and the guards 99, is a spring plate 101, which keeps the guards under tension. This plate is apertured, as shown at 102, so as to permit insertion of the string of nails therein. Attached also to the plate 97, is a spring plate 103, which has a rounded extremity 104, and which bears against the nail guide 15, its purpose being to hold the string of nails in the guide.

When the parts are in full-line position, as shown in Figure 13, with the crank 95 over center, the guards will be held in engagement with the nail guide 15, and since these guards are at this time under tension, the parts will be held in locked position. When, however, the handle 96 is moved to dotted line position, Figure 13, the guards are swung out of engagement with the nail guides, thereby permitting ready removal of the string or strings of nails from the nail guide.

It is obvious that various changes may be made in the details without departing from the spirit of this invention. It is, therefore, to be understood that this invention is not to be limited to the specific construction shown and described.

Having thus described the invention, what is claimed is:—

1. In a machine of the class described, fastener inserting means having a predetermined fastener inserting movement, a presser foot adapted to form an abutment for the moving work, and means for adjusting said presser foot to a plurality of positions with respect to said fastener inserting means, adapted to selectively control the insertion of the fastener countersunk in, flush with, or protruding from the work.

2. In a machine of the class described, a support, fastener inserting means mounted on said support, a presser-foot mounted for movement on said support, and means for adjusting said presser-foot to a plurality of adjusted positions, adapted to selectively control the insertion of the fastener countersunk in, flush with, or protruding from the work.

3. In a machine of the class described, a support, fastener inserting means mounted on said support, a carrier, a presser-foot and a work guide mounted on said carrier, and means for adjusting said carrier, adapted to selectively vary the extent of insertion of the fastener.

4. In a machine of the class described, a support, fastener inserting means mounted on said support, a carrier, a presser-foot and a work guide mounted on said carrier, means mounted on said support for adjusting said work guide on said carrier, and means supporting said carrier at the point of adjustment of said work guide.

5. In a machine of the class described, a support, fastener inserting means mounted on said support, a carrier, a presser-foot and a work guide mounted on said carrier, means on said support for adjusting said work guide on said carrier, means supporting said carrier at the point of adjustment of said work guide, and means for adjusting said carrier, adapted to selectively vary the extent of insertion of the fastener.

6. In a machine of the class described, a support, fastener inserting means mounted on said support, a carrier, a presser-foot and a work guide mounted on said carrier, means for adjusting said work guide on said carrier, and an actuator movable to a plurality of positions to adjust said carrier, adapted to selectively vary the extent of insertion of the fastener.

7. In a machine of the class described, fastener inserting mechanism, including a feeding and cutting member, means for actuating said member, and a connection between said actuating means and said member, adapted to yieldingly move said member while operating.

8. In a machine of the class described, fastener inserting mechanism, including a feeding and cutting member, a cam for actuating said member, and a connection between said cam and said member, adapted to yieldingly move said member while operating.

9. In a machine of the class described, fastener inserting mechanism, including a feeding and cutting member, an arm for pivotally sustaining said member, a cam, and a connection between said cam and said arm, adapted to yieldingly move said member while operating.

10. In a machine of the class described, fastener inserting mechanism, a guide for fastener stock, a guard adapted to engage said guide and the fastener stock therein, and means for moving said guard into and out of engagement with the fastener stock.

11. In a machine of the class described, fastener inserting mechanism, a guide for fastener stock, a guard adapted to engage said guide and the fastener stock therein, and means for moving said guard into and out of engagement with the fastener stock, adapted to hold said guard in engaging position.

12. In a machine of the class described, fastener inserting mechanism, a guide for fastener stock mounted for movement on said frame, a guard mounted on said guide and adapted to engage said guide and the fastener stock therein, and means for moving said guard into and out of engagement with the fastener stock.

13. In a machine of the class described, fastener inserting mechanism, a guide for fastener stock mounted for movement on said frame, a guard mounted on said guide and adapted to engage said guide and the fastener stock therein, and means mounted on said guide for moving said guard into and out of engagement with the fastener stock.

14. In a machine of the class described, fastener inserting mechanism, a guide for a plurality of strands of fastener stock, gaurds adapted to engage said guide and the strands of fastener stock therein, and a spring for holding said guards in engaging position.

15. In a machine of the class described, fastener inserting mechanism, a guide for fastener stock, a guard adapted to engage said guide and the fastener stock therein, a supplemental guard engaging said guide and adapted to direct and maintain the fastener stock in said guide, and means for moving said supplemental guard into and out of engagement with said guide.

16. In a machine of the class described, fastener inserting mechanism, a guide for fastener stock, a guard adapted to engage said guide and the fastener stock therein, a supplemental guard engaging said guide and adapted to direct and maintain the fastener stock in said guide, and means for moving said guards into and out of engagement with said guide.

17. In a machine of the class described, a work feeding awl, a driver, a nail guiding throat, a guide for directing a string of connected nails into said throat, feeding and cutting means, constructed and arranged to feed the string into said throat by engagement with the head of a nail on the string and constructed and arranged to cut the end nail from the string, adapted to position a cut nail in said throat, means constructed and arranged to move said awl and said throat alternately into and out of the line of drive, and means for aligning said guide with said throat in a direction along the path of movement of said throat.

18. In a machine of the class described, a work feeding awl, a driver, a nail guiding throat, a movable guide for directing a string of connected nails into said throat, feeding and cutting means, constructed and arranged to feed the string into said throat by engagement with the head of a nail on the string and constructed and arranged to cut the end nail from the string, adapted to position a cut nail in said throat, means constructed and arranged to move said awl and said throat alternately into and out of the line of drive, and means for adjusting the normal position of said guide with respect to said throat in a direction along the path of movement of said throat.

19. In a machine of the class described, a work feeding awl, a driver, a nail guiding throat, a movable guide for directing a string of connected nails into said throat, feeding and cutting means, constructed and arranged to feed the string into said throat by engagement with the head of a nail on the string and constructed and arranged to cut the end nail from the string, adapted to position a cut nail in said throat, means constructed and arranged to move said awl and said throat alternately into and out of the line of drive, an adjustable stop for said guide, and means for holding said guide in engagement with said stop.

20. In a machine of the class described, a throat and an awl, both mounted for movement into and out of the line of drive, means having maintained connections with said awl but operating independently for moving said awl laterally in the direction of the feed in successive steps, and means for moving said awl to pierce the work between said steps.

21. In a machine of the class described, a throat having a driver passage, and an awl, both mounted for movement into and out of the line of drive, and means adapted to move said awl in successive steps when the feeding movement of said awl is less than the minimum distance between said awl and the driver passage, and adapted to move said awl in a single step when the feeding movement is greater than the minimum distance between said awl and said driver passage.

22. In a machine of the class described, a throat having a driver passage, and an awl, both mounted for movement into and out of the line of drive, means for moving said throat and said awl laterally, and means for adjusting the lateral movement of said awl, adapted to cause movement of said awl in successive steps when the feeding movement of said awl is less than the distance between said awl and the driver passage and adapted to cause movement of said awl in a single step when the feeding movement is greater than the minimum distance between said awl and said driver passage.

23. In a machine of the class described, fastener inserting mechanism, a work feeding awl, means for initially imparting a clearing movement to said awl, means for imparting a feeding movement to said awl, and means for varying the clearing movement in the opposite sense as the feeding and total movements of said awl.

24. In a machine of the class described, fastener inserting mechanism, a work feeding awl, means for initially imparting a clearing movement to said awl, means for imparting a feeding movement to said awl, and means for increasing the clearing movement with decrease of feeding and total movements of said awl.

25. In a machine of the class described, fastener inserting mechanism including an element mounted for movement into and out of the line of drive, a work feeding awl mounted for movement into and out of the line of drive, means for imparting to said awl successively, an initial clearing movement in the direction of the feed, a piercing movement and a feeding movement, means for varying the feeding movement of said awl, and means adapted to insure the positioning of said element in the line of drive at varying feeding movements of said awl.

26. In a machine of the class described, fastener inserting mechanism including an element mounted for movement into and out of the line of drive, a work feeding awl mounted for movement into and out of the line of drive, means for imparting to said awl successively, an initial clearing movement in the direction of the feed, a piercing movement and a feeding movement, means for increasing the feeding movement of said awl without increasing the clearing movement, and means adapted to insure the positioning of said element in the line of drive at varying feeding movements of said awl.

27. In a machine of the class described, fastener inserting mechanism including an element mounted for movement into and out of the line of drive, a work feeding awl mounted for movement into and out of the line of drive, means for imparting to said awl successively, an initial clearing movement in the direction of the feed, a piercing movement and a feeding movement, means for increasing the feeding movement of said awl adapted to decrease the clearing movement, and means adapted to insure the positioning of said element in the line of drive at varying feeding movements of said awl.

28. In a machine of the class described, fastener inserting mechanism including a throat mounted for movement into and out of the line of drive, a work feeding awl mounted adjacent said throat and for movement into and out of the line of drive, means for imparting to said awl successively, an initial clearing movement while said throat moves out of the line of drive, a piercing movement and a feeding movement, means for varying the feeding movement of said awl, and means adapted to insure the positioning of said throat in the line of drive at varying feeding movements of said awl.

29. In a machine of the class described, fastener inserting mechanism including a throat mounted for movement into and out of the line of drive, a work feeding awl mounted adjacent said throat and for movement into and out of the line of drive, means for imparting to said awl successively, an initial clearing movement while said throat moves out of the line of drive, a piercing movement and a feeding movement, means for increasing the feeding movement of said awl without increasing the clearing movement, and means adapted to insure the positioning of said throat in the line of drive at varying feeding movements of said awl.

30. In a machine of the class described, fastener inserting mechanism including a throat mounted for movement into and out of the line of drive, a work feeding awl mounted adjacent said throat and for movement into and out of the line of drive, means for imparting to said awl successively, an initial clearing movement while said throat moves out of the line of drive, a piercing movement and a feeding movement, means for increasing the feeding movement of said awl adapted to decrease the clearing movement, and means adapted to insure the positioning of said throat in the line of drive at varying feeding movements of said awl.

31. In a machine of the class described, fastener inserting mechanism including an element mounted for movement into and out of the line of drive, a work feeding awl mounted for movement into and out of the line of drive, means for imparting to said awl successively, an initial clearing movement in the direction of the feed, a piercing movement and a feeding movement, means for varying the feeding movement of said awl, and means for moving said element adapted to cause the same to dwell when in the line of drive in order to permit the insertion of a fastener into the hole formed by the awl.

32. In a machine of the class described, fastener inserting mechanism including an element mounted for movement into and out of the line of drive, a work feeding awl mounted for movement into and out of the line of drive, means for imparting to said awl successively, an initial clearing movement in the direction of the feed, a piercing movement and a feeding movement, means for increasing the feeding movement of said awl without increasing the clearing movement, and means for moving said element adapted to cause the same to dwell when in the line of drive in order to permit the insertion of a fastener into the hole formed by the awl.

33. In a machine of the class described, fastener inserting mechanism including an element mounted for movement into and out of the line of drive, a work feeding awl mounted for movement into and out of the line of drive, means for imparting to said awl successively, an initial clearing movement in the direction of the feed, a piercing movement and a feeding movement, means for increasing the feeding movement of said awl adapted to decrease the clearing movement, and means for moving said element adapted to cause the same to dwell when in the line of drive in order to permit the insertion of a fastener into the hole formed by the awl.

34. In a fastener inserting machine, awl feeding mechanism, comprising, a work feeding awl, means for imparting to said awl successively, an initial clearing movement in the direction of the feed, a piercing movement and a feeding movement, and means for varying the feeding movement of said awl adapted upon a certain increase of feeding movement to eliminate the clearing movement.

35. In a fastener inserting machine, awl feed mechanism, comprising, a work feeding awl, an actuated lever connected with said awl, a second actuated lever, and a block connecting said levers and shiftable along said second lever to a position opposite its pivot.

36. In a fastener inserting machine, awl feed mechanism, comprising, a work feeding awl, a lever connected with said awl, a second lever, cams adapted to actuate said levers in timed relation, and a block connecting said levers and shiftable along said second lever to a position opposite its pivot.

37. In a fastener inserting machine, awl feed mechanism, comprising, a work feeding awl, a lever connected at one end to said awl, an actuator engaging the other end of said lever, a second actuated lever, and a block connecting and slidable along said levers.

38. In a fastener inserting machine, awl feed mechanism, comprising, a work feeding awl, a lever connected at one end to said awl, an actuator engaging the other end of said lever, a second actuated lever, and a block connecting and slidable along said levers to a position opposite the pivot of said second lever.

39. In a fastener inserting machine, awl feed mechanism, comprising, a work feeding awl, a lever connected at one end of said awl, a cam engaging the other end of said lever, a second lever, a cam operating in timed relation with said first cam and actuating said second lever, and a block connecting and slidable along said levers.

40. In a fastener inserting machine, awl feed mechanism, comprising, a work feeding awl, a lever connected at one end of said awl, a cam engaging the other end of said lever, a second lever, a cam operating in timed relation with said first cam and actuating said second lever, and a block connecting and slidable along said levers to a position opposite the pivot of said second lever.

In testimony whereof I affix my signature this 12th day of April, 1917.

STEPHEN A. DOBYNE.